United States Patent [19]

Toyoshima

[11] Patent Number: 5,640,448

[45] Date of Patent: Jun. 17, 1997

[54] KEY TELEPHONE SYSTEM CAPABLE OF SIMULATION BY BUTTON OPERATIONS

[75] Inventor: Fumiyoshi Toyoshima, Tokyo, Japan

[73] Assignee: NEC Corporation, Tokyo, Japan

[21] Appl. No.: 599,351

[22] Filed: Feb. 9, 1996

[30] Foreign Application Priority Data

Feb. 9, 1995 [JP] Japan ................... 7-021447

[51] Int. Cl.⁶ ................................. H04M 1/00
[52] U.S. Cl. .................. 379/165; 379/156; 379/157; 379/164; 379/166
[58] Field of Search ....................... 379/156, 157, 379/162, 163, 164, 165, 166, 201; 434/307, 321, 379

[56] References Cited

U.S. PATENT DOCUMENTS

| | | | |
|---|---|---|---|
| 3,961,142 | 6/1976 | Caffine | 379/166 |
| 4,093,830 | 6/1978 | Pappas | 379/165 |
| 4,117,274 | 9/1978 | Cannon | 379/164 |
| 4,133,985 | 1/1979 | Rasmussen | 379/156 |
| 4,351,987 | 9/1982 | Feil | 379/163 |
| 4,685,122 | 8/1987 | Deveson | 434/379 |

FOREIGN PATENT DOCUMENTS

| | | |
|---|---|---|
| 63-158956 | 7/1988 | Japan . |
| 3-108996 | 5/1991 | Japan . |

*Primary Examiner*—Curtis Kuntz
*Assistant Examiner*—Vijay Shankar
*Attorney, Agent, or Firm*—Sughrue, Mion, Zinn, Macpeak & Seas

[57] ABSTRACT

Execution of guide simulation of the button operation is accompanied with the display of the button operation procedure and also the indication of the fact that a key telephone is actually used or a tone is being generated. The simulation state is first set by the button operation in one of many key telephone sets (1-1 to 1-m), and first control information is produced. A main control unit 10 sets an initial state of simulation in accordance with the first control information at a particular key telephone set which outputs the first control information. Second control information is then supplied to a main control unit 10 by pushing the operation button of the key telephone set, and display of the button operation procedure and indication of a lamp or generation of the tone, which are similarly created as a function is actually executed, are carried out in the key telephone set under control of the main control unit 10. In other words, a user can easily master the button operation by falsely creating the state where the key telephone system is being used.

10 Claims, 6 Drawing Sheets

KEY TELEPHONE SYSTEM CAPABLE OF SIMULATION BY BUTTON OPERATIONS

BACKGROUND OF THE INVENTION

1. Field of the Invention

The present invention relates to a key telephone system having a plurality of key telephone sets and a main control unit for controlling these telephone sets. More particularly, the invention is directed to a key telephone system capable of simulating for the state where the key telephone system is actually used by the button operation of the key telephone sets.

2. Description of the Related Art

A key telephone system has been conventionally provided with a plurality of functions, e.g., outgoing call, hold, transfer and conference call functions, and these functions are executed under control of the main control unit in accordance with the button operation of each of the key telephone sets. However, as the number of functions is increased, the operation becomes complicated, and hence it takes time for a user to master the operation procedure. In order to help a user to operate the buttons, the conventional key telephone system displays, for example, on a display of each key telephone set, the operation procedure for executing each function when a HELP button is pushed.

A key telephone system disclosed in Japanese patent laid-open publication No. 3(1991)-108996 stores character data representing a comment explaining each function to be executed and representing its operation procedure in a memory of the main control unit. The memory also stores a retrieval code inherent to each of the character data, and the character data and the retrieval code are stored to be treated as a pair. When a specific retrieval code is generated by the button operation of a key telephone set, the main control unit reads from the memory the character data which is a comment relating to the operation procedure in response to the retrieval code and transfers the read data to the key telephone set to display the comment on a display portion.

Further, a key telephone system disclosed in Japanese patent laid-open publication No. 63(1988)-158956 displays on a display of a key telephone set the procedure of the button operation for a function in accordance with the state of an operation such as answering an incoming call or making an outgoing call, the function being executed after the operation.

The above-mentioned key telephone systems display on a display portion of a key telephone set the operation guide by the button operation.

However, in these conventional key telephone systems, only the operation guide such as a comment or the button operation procedure is displayed. If a function is not executed by actually using the key telephone system, the key telephone set does not indicate lamps or generate tones. Therefore, the user can not recognize a change in the indication of each lamp of the key telephone set and in the tone heard from a handset if the key telephone system is not actually used. It is hard for the user to master the button operation procedure unless he or she learns the button operation procedure as if the key telephone system is actually used. Thus, it takes time for the user to master the button operation procedure for executing each function, and consequently he or she can not help displaying the operation guide or using an operation manual book.

SUMMARY OF THE INVENTION

It is therefore an object of the present invention to provide a key telephone system capable of simulation of the button operation in order that a user may quickly master the button operation procedure for executing a plurality of functions such as outgoing call, hold, transfer, simplified dial and conference call functions.

According to the key telephone system of the present invention, not only the procedure of the button operation is displayed during a simulation state, but also indication of a lamp and generation of a tone are carried out during the simulation state in response to the button operation in the similar manner as a function is actually executed. That is, a user can easily understand the button operation by temporarily establishing the state where the key telephone system is actually used.

More particularly, the key telephone system according to the present invention comprises a plurality of key telephone sets and a main control unit which connects the key telephone sets and executes a plurality of functions in correspondence with button operations of the key telephone sets.

Each of the key telephone sets comprises: selection buttons for selecting a plurality of functions; an information output circuit for outputting to the main control unit first control information representing a start of simulation and second control information obtained by the operation of the selection buttons; state indicators for indicating the execution state of each function; a voice output unit for outputting a tone and a voice; and a display for displaying data concerning the functions.

Further, the main control unit comprises: a first memory circuit for storing guide display data for displaying the guidance of the button operation procedure required for executing the functions on the display of the key telephone set; a second memory circuit for storing indication simulation data for executing indication simulation of the state indicators in accordance with the button operation; and a third memory circuit for storing tone simulation data for executing tone simulation of a voice output unit.

The main control unit further comprises, a control circuit responsive to the first control information, which sets an initial state of simulation at a particular key telephone set which output the first control information, and a simulation control circuit in response to the second control information received after the first control information. The simulation control circuit controls the execution of the indication simulation or tone simulation at the particular key telephone set in accordance with the indication simulation data or tone simulation data stored in the second or third memory circuit, and controls the display of the guidance at the particular key telephone set responsive to the guide display data stored in the first memory circuit.

The guide display data output from the simulation control circuit are transmitted to the key telephone set and displayed on the display thereof. However, the visual guide may be substituted by the voice guide. In this case, the main control system is additionally provided with a voice generation circuit for generating guide voices.

The tone simulation data may not be used in the present invention.

In addition, the simulation control circuit of the main control unit may have means for judging whether the order of the button operation is correct and advancing simulation only if the order is correct.

DETAILED DESCRIPTION OF THE PREFERRED EMBODIMENTS

Figure 1:
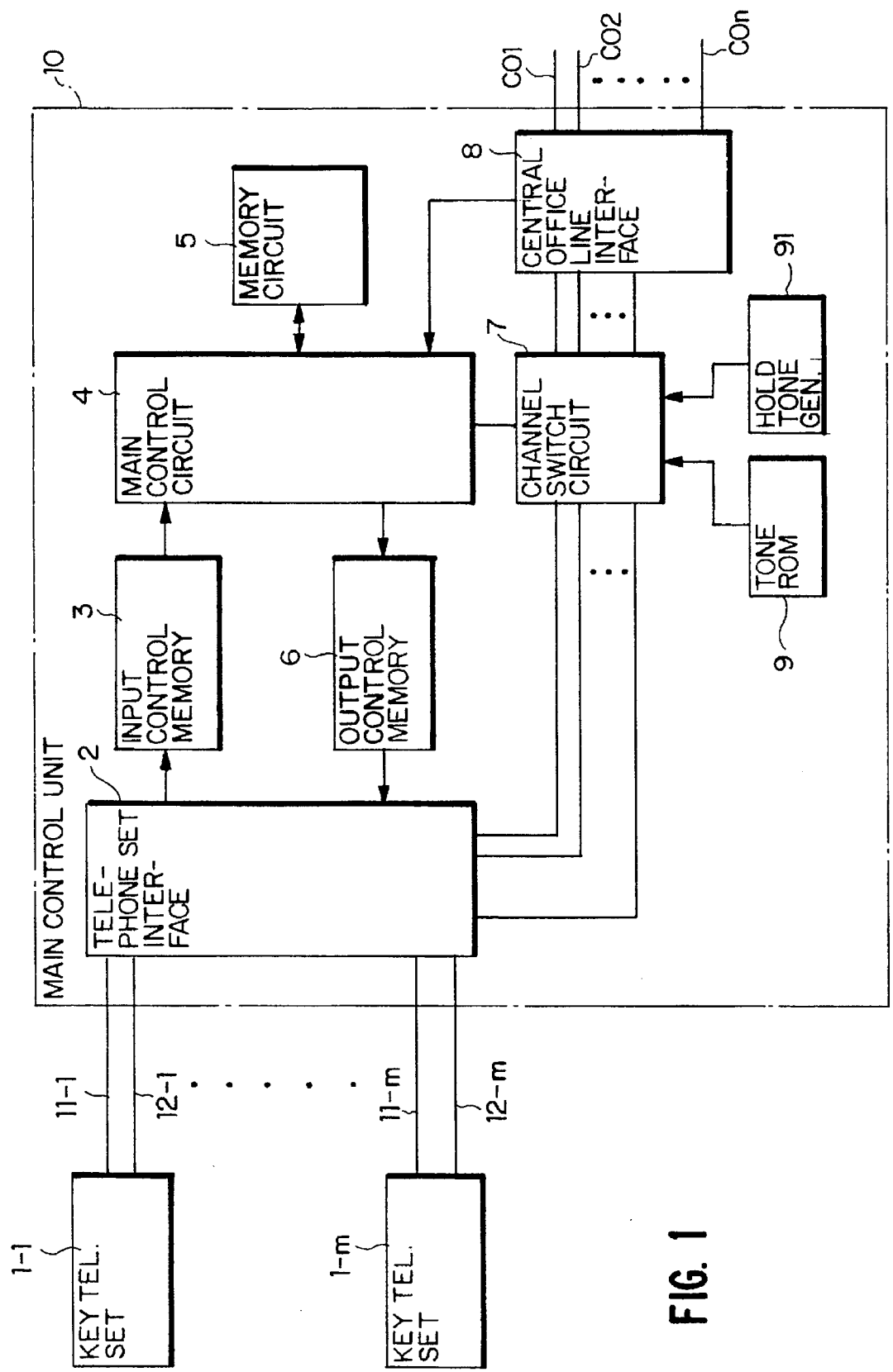
FIG. 1 is a block diagram showing a bottom telephone system according to an embodiment of the present invention.

Referring to FIG. 1, a key telephone system according to the embodiment includes a main control unit 10 for accommodating a plurality of central office lines CO1 to COn, and key telephone sets 1-1 to 1-m. The main control unit 10 is provided with: a telephone set interface 2 connected with the key telephone sets 1-1 through 1-m; an input control portion 3; a main control circuit 4 for controlling the entire key telephone system; a memory circuit 5 for storing data used for executing indication simulation and tone simulation concerning the present invention; an output control portion 6; a channel switch circuit 7; a central office line interface 8; a tone ROM 9; and a hold tone generation circuit 91. Simulation described herein means the operation such that the indication state of each lamp of any key telephone set is changed or a tone or a ring sound is output from a handset or a speaker in accordance with the button operation as if a user is using any of the key telephone sets 1-1 to 1-m. The user can operate the key telephone set under the guidance by the control of the main control unit 10 about the button operation procedure in the same way as he or she is actually using the key telephone set. In simulation, however, seizing of channels between the key telephone sets and the central office lines CO1 to COn, obtainment of channels among the key telephone sets or transmission of signals over the central office lines are not performed.

The central office lines CO1 to COn are connected to an exchange office or a PBX. The central office line interface 8 is connected between the channel switch circuit 7 and the central office lines CO1 to COn and executes detection of reception of incoming signals over each of the central office lines CO1 to COn, transmission of dial signals over the central office lines and analog-to-digital conversion of voice signals.

The channel switch circuit 7 seizes channels between the central office lines CO1 to COn and the key telephone sets 1-1 to 1-m under the control of the main control circuit 4. Voice signals are passed through the channel switch circuit 7 and transmitted to the key telephone sets 1-1 to 1-m. The voice signals passing through the channel switch circuit 7 are digital signals. The switching of channels in the channel switch circuit 7 are performed in the time dividing manner.

The telephone set interface 2 is connected to voice channels 11-1 to 11-m and data channels 12-1 to 12-m which are connected to the key telephone sets 1-1 to 1-m. The voice channels 11-1 to 11-m transmit tone signals or voice signals and are connected to the channel switch circuit 7. The data channels 12-1 to 12-m transmit various control information or data for executing the later-described simulation and functions, and are connected to an input control portion 3 and an output control portion 6 through the telephone set interface 2.

The input control portion 3 identifies the button information obtained by the button operation of the key telephone set from the control information supplied from the telephone set interface 2 and outputs the thus-identified button information to the main control circuit 4.

The main control circuit 4 executes various functions and simulation in accordance with the button information. In response to first control information directing the start of simulation and second control information obtained by the subsequent button operation, the main control circuit 4 executes a program for carrying out simulation which is stored in the memory circuit 5, reads data relating to the various functions and simulation or data concerning the button operation procedure from the memory circuit 5, and outputs them to the output control portion 6. Functions controlled by the main control circuit 4 are, outgoing call, hold, transfer, simplified dial, tripartite conference call and other functions.

The output control portion 6 serially arranges data supplied from the main control circuit 4 and sequentially outputs them to the data channels 12-1 to 12-m through the key telephone interface 2.

A tone ROM 9 generates a second tone or a ringing tone under the control of the main control circuit 4 at the time of hold, tripartite conference or transfer operation and outputs it to the channel switch circuit 7. The second tone or the ringing tone is transmitted from the channel switch circuit 7 to a voice channel of the key telephone set. Further, the tone ROM 9 generates various response tone signals over the central office lines CO1 to COn.

The hold tone generation circuit 91 is connected to the channel switch circuit 7 and transmits the hold tone to the central office line which is being held through the channel switch circuit 7 by a direction from the main control circuit 4.

Figure 2:
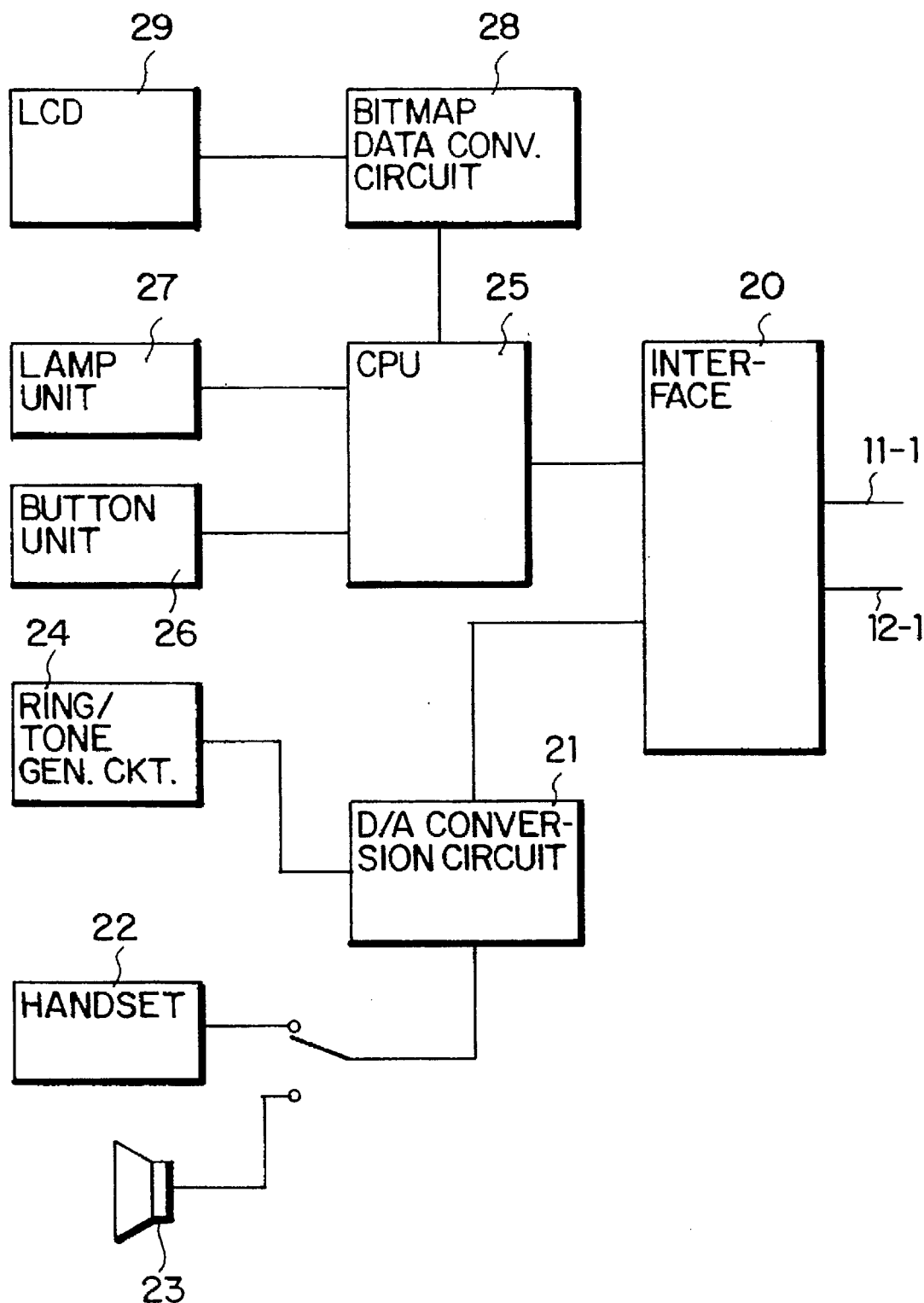
FIG. 2 is a block diagram showing a key telephone set of the key telephone system illustrated in FIG. 1.

Referring to FIG. 2, the key telephone sets 1-1 to 1-m are connected to the voice channels 11-1 to 11-m and the data channels 12-1 to 12-m through an interface 20, respectively. The voice channels are connected to a digital/analog conversion circuit 21 through the interface 20. An output from the digital/analog conversion circuit 21 is supplied to a handset 22 or a speaker 23 in accordance with the fact that the key telephone set is in the call state using the speaker or the handset.

A ring/tone generation circuit 24 generates a ring/tone signal at the time of dialing operation. The ring/tone signal is converted into a digital signal in the digital/analog conversion circuit 21 and sent to the main control unit 10 through the interface 20.

A CPU 25 is connected to an operation button unit 26, a lamp unit 26 and a bitmap data conversion circuit 28. The bitmap data conversion circuit 28 receives from the CPU 25 character data used for display, converts them into bitmap data and outputs them to a liquid crystal display (LCD) 29 for performing bitmap display. The character data are the guide display data generated in the main control unit 10.

Figure 3:
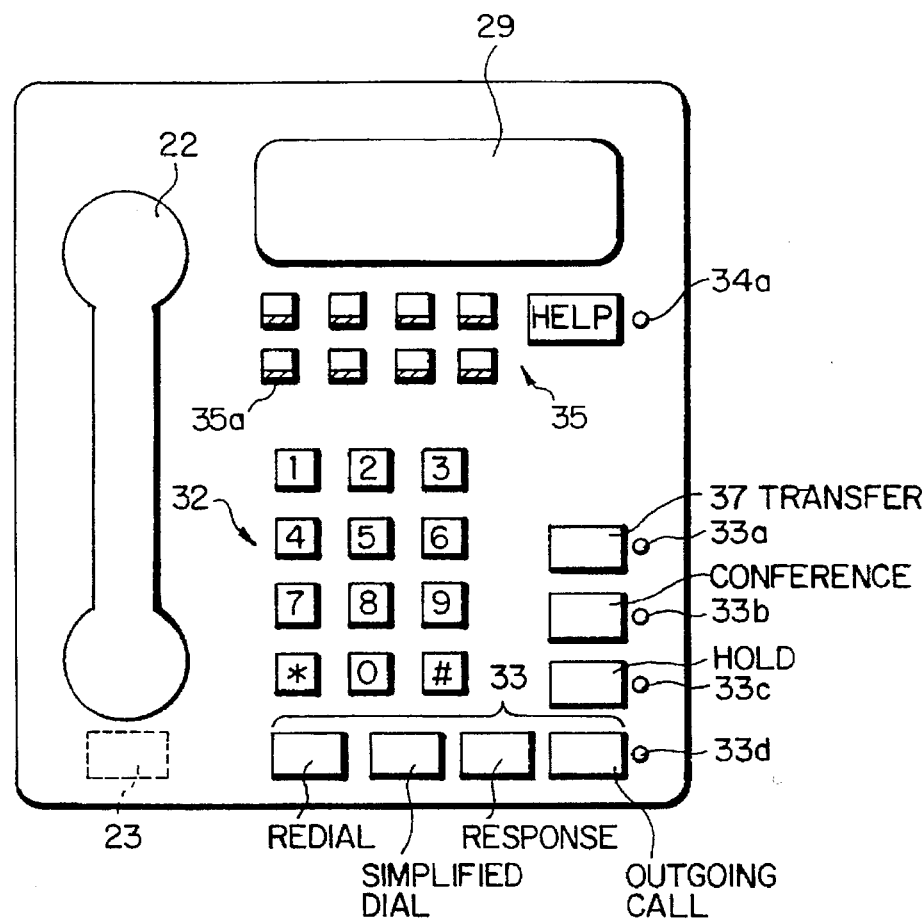
FIG. 3 is a top plan view showing the key telephone set illustrated in FIG. 2.

FIG. 3 is a top plan view showing each of the key telephone sets 1-1 to 1-m. In FIG. 3, the operation button unit 26 shown in FIG. 2 is made up of: dial buttons 32; a plurality of function selection buttons 33 for selecting one of many functions such as transfer, conference, hold, outgoing call, answer, simplified dial and redial functions; eight central office line buttons 35; and a HELP button 34 for starting/terminating simulation.

The lamp unit 27 in FIG. 2 includes: a transfer indication lamp 33a, a conference indication lamp 33b, a hold lamp 33c and an outgoing call lamp 33d which are arranged next to the function selection buttons 33; central office line indication lamps 35a fixed to respective central office line buttons 35; and a HELP indication lamp 34a. These members belonging to the lamp unit 27 are state indicators. In other words, each of the lamps 33a, 33b, 33c and 33d turns on or blinks during the transfer, tripartite conference, hold or outgoing call operation, while each central office line indication lamp 35a turns on when seizing a central office line corresponding with each central office line button. Further, the central office line indication lamp 35a blinks when the corresponding central office line is being held.

When ON/OFF information supplied from the operation button unit 26 is output to the CPU 25, the CPU 25 outputs it to the data channels through the interface 20 as the control information. Further, when the CPU 25 receives lamp indication data from the data channels, controls the lamp unit 27 on the basis of the lamp indication data. Furthermore, when the CPU 25 receives from the data channels the character data having characters which are to be displayed on the LCD 29, outputs them to the bitmap data conversion circuit 28.

When the HELP button 34 is pushed, the CPU 25 produces the first control information for initiating or terminating simulation. Further, the CPU 25 generates many kinds of second control information when the function selection buttons 33, the dial buttons 32 or the central office line buttons 35 are pushed during simulation. Both the first control information and the second control information are transmitted through the data channels.

Figure 4:
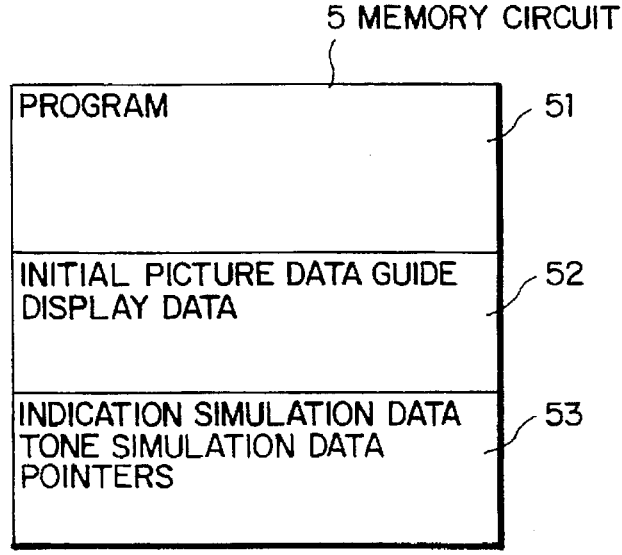
FIG. 4 is a block diagram showing the storage area partition of a memory circuit of the main control unit of the key telephone system illustrated in FIG. 1.

FIG. 4 shows a memory map of the memory circuit 5 in which a control program for executing simulation is stored. The memory circuit 5 includes first to third memory portions 51, 52 and 53. The first memory portion 51 stores the control program for executing simulation. The main control circuit 4 in FIG. 1 carries out simulation in accordance with this control program. The second memory portion 52 stores initial picture display data and guide display data for displaying an initial picture before execution of the respective functions and guidance of the button operation for executing each function on the LCD 29 (FIGS. 2 and 3) of each key telephone set, respectively. The initial picture display data and the guide display data are stored as character code data. The third memory portion 53 stores indication simulation data for performing indication simulation of the lamp unit 27 in accordance with the button operation of the key telephone set during simulation. Also the third memory portion 53 stores tone simulation data for executing tone simulation at the speaker 23 or the handset 22 during simulation. The indication simulation data stored in the third memory portion 53 are the same with the lamp indication data for executing indication of the lamp unit 27, while the tone simulation data are not tone signals but data for controlling reading operation of the tone ROM 9 shown in FIG. 1. The tone ROM 9 therefore constitutes a part of the third memory portion.

Figure 5:
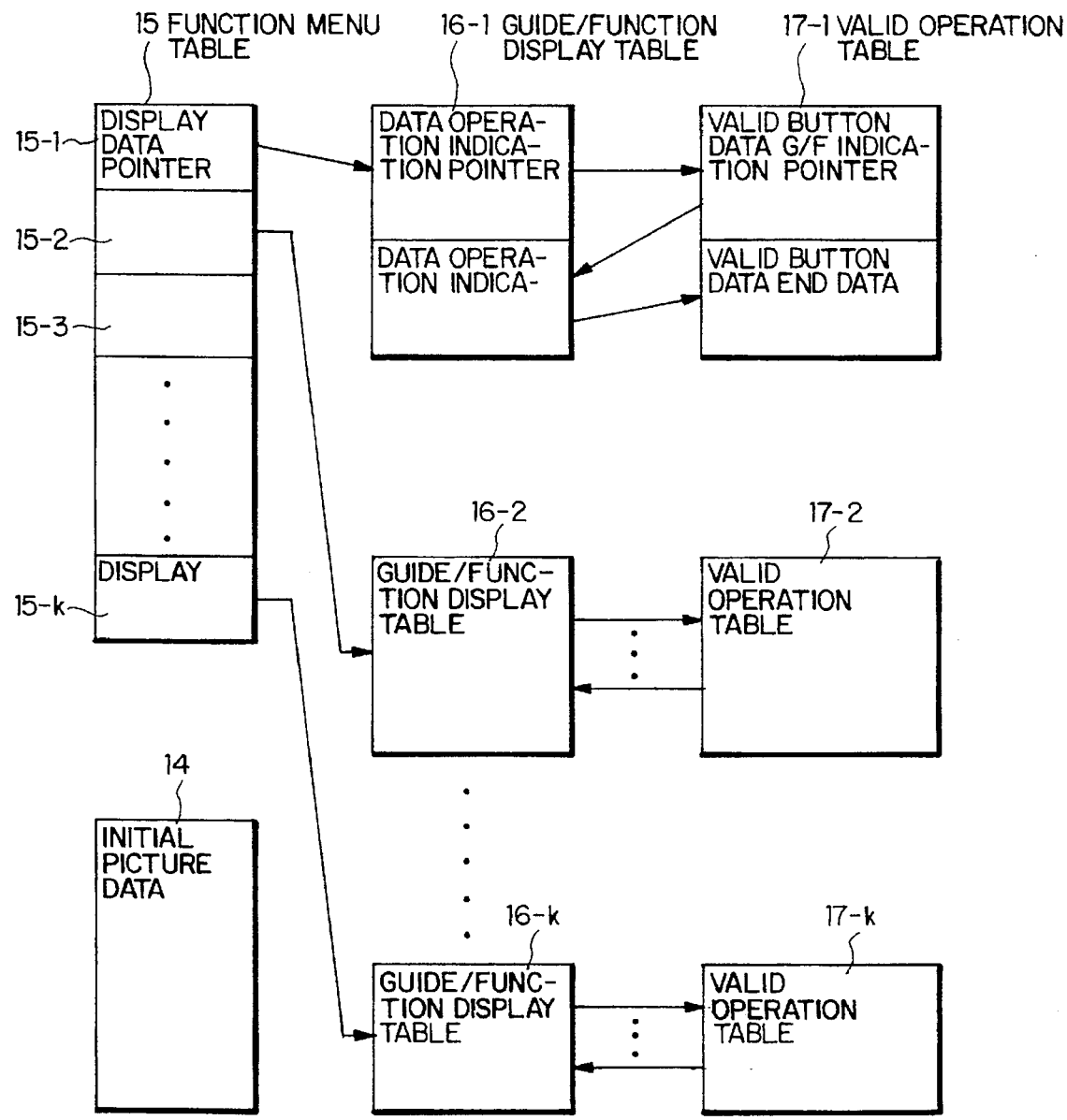
FIG. 5 is a block diagram representing the storage area partition obtained when the storage area of the memory circuit illustrated in FIG. 4 is separated in accordance with each function.

The memory circuit 5 shown in FIG. 4 has such a storage configuration as shown in FIG. 5 in accordance with each function. In FIG. 5, an initial picture table 14 is provided within the second memory portion 52 and stores the initial picture data displayed on the LCD 29 of the key telephone set. The initial picture data are read after the simulation is started. They represent an initial picture of information of each function.

A function menu table 15 stores display data pointers 15-1 to 15-k used for pointing out the guide display data stored in a guide/function display tables 16-1 to 16-k for displaying the first guide on the LCD 29. The display data pointers 15-1 to 15-k make indication at the second memory portion 52 storing the guide display data. The display data pointer 15-1 is selected for starting the outgoing call function; the display data pointer 15-2, for starting the hold function; the display data pointer 15-3, for starting the transfer function; the display data pointer 15-4, for starting the simplified dialing function; and the display pointer 15-5, for starting the tripartite conference call function. These display data pointers are selected when the functions are selected by the button operation of the key telephone sets 1-1 to 1-m after the start of simulation.

The guide/function display tables 16-1 to 16-k are provided in correspondence with the display data pointers 15-1 to 15-k, respectively. Each of the guide/function display tables 16-1 to 16-k stores the indication simulation data and tone simulation data as well as the guide display data indicated by the display data pointers 15-1 to 15-k. The simulation data are stored with an operation indication pointer. The operation indication pointers in the guide/function display tables 16-1 to 16-k indicate addresses of valid operation tables 17-1 to 17-k at which valid button data for the button operated on the key telephone set are stored.

The valid operation tables 17-1 to 17-k are provided in correspondence with the guide/function display tables 16-1 to 16-k, respectively. The valid operation tables 17-1 to 17-k store valid button data indicated by the operation indication pointers and also store guide/function indication pointers for indicating memory areas of the guide/function display tables 16-1 to 16-k storing the next guide display data or the next indication simulation data and next tone simulation data. Namely, each guide/function indication pointer indicates an address at which data of each of the guidance/function display table 16-1 to 16-k are stored.

As mentioned above, the guide/function display pointers 16-1 to 16-k and the valid operation tables 17-1 to 17-k provided within the memory circuit 5 are stored together with the pointers so that the guide display data and the simulation data are sequentially read out using the pointers. Consequently, each of data can be efficiently read from the second and third memory portions 52 and 53 of the memory circuit 5.

Figure 6:
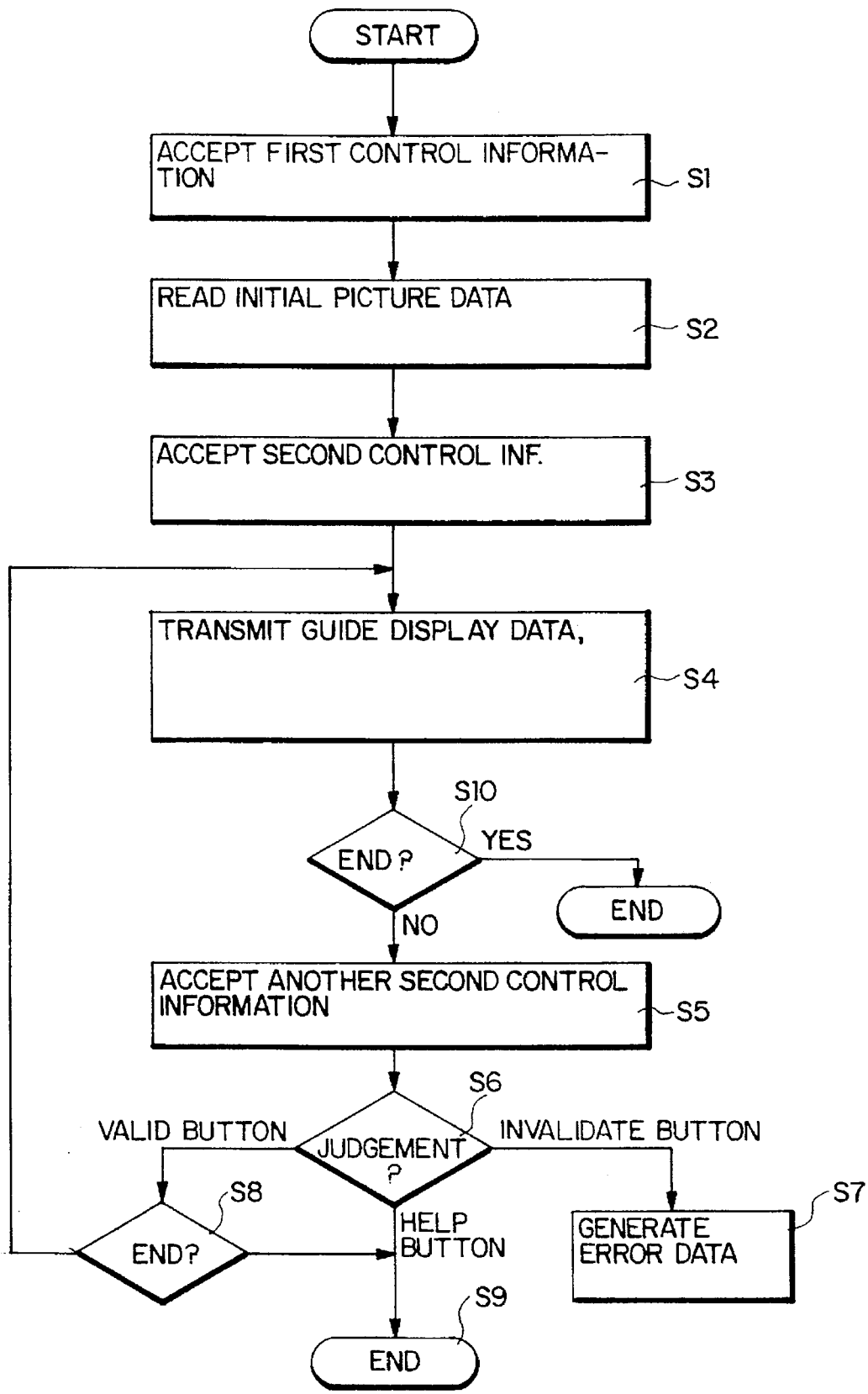
FIG. 6 is a flowchart showing a basic operation of simulation according to an embodiment of the present invention.

FIG. 6 is a flowchart showing a control program for executing simulation.

In the first place, it is assumed that the HELP button 34 (FIG. 3) of an arbitrary key telephone set (for example, the key telephone set 1-1) among the key telephone sets 1-1 to 1-m is pushed. The button information concerning the HELP button 34 of the key telephone set 1-1 is transferred as the first control information to the main control unit 10 through the data channel 11-1 as shown in FIG. 1. The input control portion 3 of the main control unit 10 identifies the first control information from the data channel and outputs it to the main control circuit 4. By doing so, the main control circuit 4 accepts the first control information (step S1), and reads the initial picture data from the initial picture table 14 (FIG. 5) stored in the second memory portion 52 of the memory circuit 5 in response to this information (step S2). The initial picture data are used for displaying information of a plurality of functions and transmitted to the key telephone set 1-1 through the output control portion 6, key telephone interface 2 and the data channel 12-1. The initial picture data are detected by the CPU 25 (FIG. 2), and their content thereof is displayed on the LCD 29. At this time, the LCD 29 collectively or sequentially displays information of a plurality of functions for simulation. The information of the functions is displayed with numbers of dial buttons 32 imparted thereto on the LCD 29 for selection. For example, the message "Please select from outgoing call 1, hold 2, transfer 3, simplified dial 4 and conference 5" is displayed. Instead of using numbers for selecting a function, it may be possible to display a message for urging the operation of the function selection buttons 33.

Now, when the user pushes a dial button "1" in order to simulate the outgoing call operation for example, this input is transmitted as the second control information from the key telephone set 1-1 to the main control unit 10 through the data channel 12-1. As a result, the main control circuit 4 accepts the second control information (step S3).

The main control circuit 4 reads the display data pointer 15-1 in the function menu table 15 shown in FIG. 5 in response to the second control information supplied by pushing the dial button "1" and further reads the guide display data from the guide/function display table 16-1 in response to the display data pointer 15-1. The operation indication pointer is read together with the guide display data because the guide/function display table 16-1 stores this pointer therein. The operation indication pointer points out the outgoing call button data in the valid operation table 17-1, and the outgoing call button data are stored in a register within the main control circuit as the valid button data (step S4).

The guide display data read from the guide/function display table 16-1 in the step S4 are data for conducting the first operation of the button. The guide display data are fed to the CPU 25 of the key telephone set 1-1 through the output control portion 6 and the data channel 12-1 as shown in FIGS. 1 and 2. The LCD 29 then displays the content of the guide display data, for example, the message "please push the outgoing call button". There is a step at which completion of processing is judged after the step S4, but the processing is not completed at this stage.

When the user pushes the outgoing call button among the function selection buttons 33 (FIG. 3) of the key telephone set 1-1 in response to display of the guidance, the information concerning the button pushing operation is transferred to the main control unit 10 as another second control information. The main control circuit 4 accepts the second control information through the data channel 12-1 and the input control portion 3 (step S5), and then judges whether the second control information is the valid button data and, at the same time, it also judges whether the HELP button 34 (FIG. 3) has been pushed (step S6). That is, the main control circuit 4 judges whether the second control information is the same with the second valid button data stored in the register in the step S4 and whether simulation is to be completed by pushing the HELP button.

If it is judged that any button other than the outgoing call button and the HELP button has been pushed at the step S6, the main control circuit 4 generates error data to invalidate the pushing operation of the button (step S7).

When it is judged that the HELP button has been pushed, the main control circuit 4 forcibly terminates the simulation (step S9).

On the other hand, if it is judged that the outgoing call button has been pushed, the main control circuit 4 proceeds to the processing of the step S8. Completion is judged at the step S8, and the processing is again advanced to the step S4 because the processing is not completed at this point. At the step S4, the main control circuit 4 reads the indication simulation data and the guide display data for conducting the subsequent button operation from the storage area of the guide/function display table 16-1 indicated by the guide/function indication pointer provided in the valid operation table 17-1 of the memory circuit 5. The operation indication pointer is read out together with the guide display data to point out the dial button data in the valid operation table 17-1. Then, the dial button data are stored in the register within the main control circuit 4 as the valid button data. Here, the valid button data stored in the register are data concerning the dial buttons which are to be pushed after the outgoing call button.

At the step S4, the indication simulation data read from the guide/function display table 16-1 of the memory circuit 15 are lamp indication data used for indicating the outgoing call lamp 33d (FIG. 3) and the central office line lamp 35a corresponding with one central office line button of the key telephone set 1-1. The thus-read indication simulation data are transmitted through the output control portion 6 and the data channel 12-1 and detected by the CPU 25 of the key telephone set 1-1, and the CPU 25 then turns on the outgoing call lamp 33d and the central office line lamp 35a. Meanwhile, at the step S4, the guide display data are also transmitted to the key telephone set 1-1 and, when the CPU 25 detects the data, the LCD 29 displays the content of the guide display data. Here, the content of display is the message "please input the telephone number".

Display of the guidance and indication of the lamps 33d and 35a are similarly executed after the outgoing call button is pushed when the outgoing call operation is actually performed.

Incidentally, the central office line lamp does not necessarily have to be turned on at the time of the outgoing call operation.

The user sees display of the guidance and inputs the telephone number. The telephone number input at this time may be a one digit number. A number of digits of the telephone number is not detected in simulation. Thus, when any dial button is pushed, this input is accepted as the second control information at the main control circuit 4 of the main control unit 10 (step S5). The main control circuit 4 then performs the processing of the step S6. As similar to the above-mentioned operation of the outgoing call button, when it is judged that the dial button has been pushed by comparison made between the second control information and the content (data concerning the dial button) stored in the register, the processing of the step S8 is carried out, and simulation of the outgoing call operation is completed. Note that it may be possible to return to the screen showing the initial picture data when the processing is completed at the step S8.

The flowchart in FIG. 6 is similarly true of simulation of the hold, transfer, simplified dial or tripartite conference operation. Description will now be given as to simulation initiated by operation of the key telephone set 1-1 with reference to FIG. 6. It is assumed that the initial screen showing the information of a plurality of functions is displayed on the LCD 29 and the processing of the step S2 in FIG. 6 is completed for brief explanation.

1. Hold Operation

The content of the displayed initial picture is the message "Please select from outgoing call 1, hold 2, transfer 3, simplified dial 4 and conference 5".

When the user pushes the dial button "2" to simulate the hold operation, this input is transmitted from the key telephone set 1-1 to the main control unit 10 through the data channel 12-1. The main control circuit 4 then accepts the second control information (step S3) and the processing of the subsequent step is executed.

The main control circuit 4 reads the display data pointer 15-2 provided in the function menu table 15 shown in FIG. 5 in response to the second control information transmitted by pushing the dial button "2" and further reads the guide display data and the indication simulation data indicated by this pointer from the guide/function display table 16-2. Moreover, the operation indication pointer is also read from the guide/function display table 16-2 to point out the valid button data in the valid operation table 17-2. Then, the valid button data are stored in the register within the main control circuit (step S4). In this case, the valid button data are data relating to the hold button.

The guide display data read from the guide/function display table 16-2 are data used for conducting the first operation of the button. The guide display data are fed to the CPU 25 of the key telephone set 1-1 through the output control portion 6 and the data channel 12-1. As a result, the LCD 29 displays the content of the guide display data, for example, the message "please push the hold button".

In addition, the indication simulation data read from the guide/function display table 16-2 are used for falsely informing that the key telephone system is holding the central office line and correspond to the lamp indication data for indicating one of the central office line lamps. Since the actual hold operation is performed while the central office line is being held, this display is carried out on the assumption of the actual hold operation.

When the user sees the guidance displayed on the LCD 29 and pushes the hold button of the function selection buttons 33 (FIG. 3), the information concerning pushing operation of this button is again transmitted to the main control unit 10 as the second control information. The main control circuit 4 accepts the second control information through the data channel 12-1 and the input control portion 3 (step S5), and judges whether the second control information is the valid button data and whether the HELP button 34 (FIG. 3) has been pushed (step S6). That is, the main control circuit 4 judges whether the second control information is the same with the second valid button data stored in the register and whether simulation is to be completed using the HELP button.

If it is judged that any button other than the hold button and the HELP button has been pushed at the step S6, the main control circuit 4 generates the error data to invalidate the state that the button has been pushed (step S7).

Meanwhile, if it is judged that the hold button has been pushed, the main control circuit 4 advances the processing to the step S8. At the step S8, completion of simulation is judged, but simulation is not terminated at this stage and the processing hence advances to the step S4. At the step S4, the main control circuit 4 reads the indication simulation data, the tone simulation data and the guide display data for conducting the subsequent button operation from the storage area of the guide/function display table 16-2 which is pointed by the guide/function indication pointer provided in the valid operation table 17-2 of the memory circuit 5. The operation indication pointer is read out together with the guide display data to point out the valid button data in the valid operation table 17-2. Then, the valid button data are stored in the register within the main control circuit using this pointer. Here, the valid button data are data concerning the button (the central office line button) which is to be pushed after the hold button.

At the step S4, the indication simulation data read from the guide/function display table 16-2 in the memory circuit 5 are the lamp indication data for controlling lighting of the hold lamp 33c (FIG. 3) and blinking of one central office line lamp 35a of the key telephone set 1-1. The thus-read indication simulation data are transmitted through the output control portion 6 and the data channel 12-1 and detected by the CPU 25 of the key telephone set 1-1, and the CPU 25 turns on the hold lamp 33c and blinks the central office line lamp 35a. On the other hand, the main control circuit 4 controls the tone ROM 9 and the channel switch circuit 7 corresponding to the tone simulation data read at the step S4 to generate the second tone. The second tone is sent from the tone ROM 9 to the voice channel 11-1 via the channel switch circuit 7. As a result, the second tone is heard from the handset 22 or the speaker 23 of the key telephone set 1-1.

Meanwhile, the guide display data are transmitted to the key telephone set 1-1 through the output control portion 6 and the data channel 11-1 and, when the CPU 25 detects transmission of the data, the LCD 29 displays the content of the guide display data. Note that the content of display is the message "the hold operation is canceled by pushing the central office line button whose lamp is turned on".

Display of the guidance, indication of the hold lamp and the central office line lamp and generation of the second tone are similarly executed by pushing the hold button when the hold operation is actually performed. However, the hold tone can not be transmitted to the central office line in this simulation.

The user sees display of the guidance and carries out the operation for canceling the hold operation by pushing the central office line button whose lamp is turned on. When the central office line button having the lamp being turned on is pushed, this input is accepted as the second control information by the main control circuit 4 of the main control unit (step S5). The main control circuit 4 then performs the processing of the step S6. At this step, if it is judged that the central office line button having the lamp being turned on has been pushed by comparing the second control information with the content (data concerning the central office line button) stored in the register in the similar manner as the above-mentioned operation of the hold button, the processing of the step S8 is executed, but the processing is not completed at this stage and thereby proceeds to the step S4. Here, the indication simulation data are read from the guide/function display table 16-2 indicated by the valid operation table 17-2. The indication simulation data are transmitted to the key telephone set 1-1 over the data channel 12-1, and the currently-blinking central office line lamp is turned on. Thereafter, the processing is completed at the step S10.

2. Transfer Operation

The transfer is a function for calling any other key telephone set which is to be connected to the main control unit 10 to transfer a phone call during the service through the central office line.

At first, the displayed content of the initial picture is the message "Please select from outgoing call 1, hold 2, transfer 3, simplified dial 4 and conference 5".

When a user pushes the dial button "3" to simulate the transfer operation, this input is sent as the second control information from the key telephone set 1-1 to the main control unit 10 over the data channel 12-1. The main control circuit 4 consequently accepts the second control information (step S3), and the processing of the next step is executed.

The main control circuit 4 reads the display data pointer 15-3 in the function menu table 15 shown in FIG. 5 in response to the second control information transmitted by the dial button "3" and further reads the guide display data and the indication simulation data provided at an address indicated by this pointer from the guide/function display table 16-3. Moreover, the operation indication pointer is also read from the guide/function display table 16-3, and the valid button data of the valid operation table 17-3 are stored in the register within the main control circuit (step S4). The valid button data are data concerning the transfer button of the key telephone set.

The guide display data read from the guide/function display table 16-3 are used for conducting the first operation of the button. The guide display data are transmitted to the CPU 25 of the key telephone set 1-1 through the output control portion 6 and the data channel 12-1. As a result, the LCD 29 displays the content of the guide display data, for example, the message "please push the transfer button". Further, one of the central office line lamps is indicated in order to falsely inform that the key telephone system is currently seizing the central office line by the indication simulation data. This display is carried out on the assumption that the central office line is being held before the actual transfer because the actual transfer is carried out when the central office line is being held.

When the user follows the guidance displayed on the LCD 29 to push the transfer button among the function selection buttons 33 (FIG. 3) of the key telephone set 1-1, the information concerning pushing of this button is again transferred to the main control unit 10 as the second control information. The main control circuit 4 accepts the second control information through the data channel 12-1 and the input control portion 3 (step S5) and judges whether the second control information is the valid button data (the transfer button data) stored in the register at the step S4 and whether the HELP button 34 (FIG. 3) has been pushed (step S6).

If it is judged that the any button other than the transfer button and the HELP button has been pushed at the step S6, the main control circuit 4 generates the error data to invalidate pushing of this button (step S7).

On the other hand, if it is judged that the transfer button has been pushed, the main control circuit 4 proceeds to the processing of the step S8. At the step S8, judgment is made upon whether the processing is to be completed, but it is yet to be completed at this stage, thereby advancing to the step S4. At the step S4, the main control circuit 4 reads indication simulation data, the tone simulation data and the guide display data for conducting the next operation of the button from the storage area of the guide/function display table 16-3. The operation indication pointer is also read out together with the guide display data to point out the valid button data in the valid operation table 17-3. Then, the valid button data are stored in the register within the main control circuit. Note that the valid button data are data concerning the button (the dial button) which is pushed after the transfer button.

The indication simulation data read from the guide/function display table 16-3 of the memory circuit 5 at the step 4 are the lamp indication data for turning on the transfer indication lamp 33a (FIG. 3) of the key telephone set 1-1. The CPU 25 of the key telephone set 1-1 turns on the transfer indication lamp 33a corresponding to the indication simulation data. Meanwhile, at the step S4, the tone simulation data are read from the memory circuit 5 shown in FIG. 5, and the main control circuit 4 controls the tone. ROM 9 and the channel switch circuit 7. The second tone is sent over the voice channel 11-1 through the channel switch circuit 7. As a result, the second tone is heard from the handset 22 or the speaker 23 of the key telephone set 1-1.

On the other hand, the guide display data are transmitted to the key telephone set 1-1 through the output control portion 6 and the data channel 12-1 and, when the CPU 25 detects this transmission, the LCD 29 displays the content of the guide display data. Here, the content of display is the message "please input the extension number which is a destination of transfer".

Display of the guidance, indication of the transfer indication lamp and generation of the second tone are similarly carried out by pushing the transfer button when the transfer operation is actually performed.

The user sees the displayed guidance and inputs the extension number. Here, the telephone number to be input may be a one digit number. When any dial button is pushed, this input is accepted as the second control information by the main control circuit 4 of the main control unit 10 (step S5). The main control circuit 4 subsequently performs the processing of the step S6. At this step, if it is judged that the dial button has been pushed by comparing the second control information with the content (the dial button data) stored in the register in the similar manner as the above-described operation of the transfer button, the processing of the step S8 is effected. Since the processing is not completed at this stage, it is again returned to the step S4. At the step S4, the main control circuit 4 reads the tone simulation data and the guide display data for conducting the next button operation from the storage area of the guide/function display table 16-3 indicated by the guide/function indication pointer in the valid operation table 17-3 of the memory circuit 5. Since the guide/function display table 16-3 stores the operation indication pointer as well as the guide display data therein, they are read out together, and the valid button data in the valid operation table 17-3 are stored in the register within the main control circuit by this pointer. Note that the valid button data are data concerning the button (the transfer button) which is to be pushed after the dial button.

The tone simulation data read from the guide/function display table 16-3 of the memory circuit 5 at the step S4 are the data for controlling generation of the ringing tone for informing that a destination of transferee is being called up. The main control circuit 4 controls the tone ROM 9 and the channel switch circuit 7 corresponding to the tone simulation data. The ringing tone is consequently sent over to the voice channel 11-1 via the channel switch circuit 7 and output from the handset 22 or the speaker 23 of the key telephone set 1-1.

Meanwhile, at the step S4, the guide display data are transmitted to the key telephone set 1-1 through the output control portion 6 and the data channel 12-1 and, when the CPU 25 detects this transmission, the LCD 29 displays the content of the guide display data. Here, the content of display is the message "please push the transfer button".

Display of the guidance and generation of the ringing tone are similarly carried out by inputting the extension number when the actual transfer operation is performed.

The user sees the displayed guidance and pushes the transfer button. When the transfer button is pushed, this input is accepted as the second control information by the main control circuit 4 of the main control unit 10 (step S5). The main control circuit 4 then performs the processing of the step S6. At this step, if it is judged that the transfer button has been pushed by comparing the second control information with the content (data relating to the transfer button) stored in the register, the processing of the step S8 is effected and completion of the processing is detected, thereby terminating simulation.

3. Simplified Dial Operation

When a user pushes the dial button "4" in order to simulate the simplified dial operation from the initial screen, this input is sent as the second control information from the key telephone set 1-1 to the main control unit 10 over the data channel 12-1. As a result, the main control circuit 4 accepts the second control information (step S3).

The main control circuit 4 reads the display data pointer 15-4 provided in the function menu table 15 illustrated in FIG. 5 in response to the second control information corresponding with the dial button "4", and further reads the guide display data at an address designated by this pointer from the guide/function display table 16-4. Since the guide/function display table 16-4 stores the operation indication pointer as well as the guide display data, they are read out together, and then the valid button data in the valid operation table 17-4 are stored in the register within the main control circuit by this pointer (step S4). The valid button data are data concerning the simplified dial function button of the key telephone set.

The guide display data read from the guide/function display table 16-4 are used for conducting the first operation of the button. The guide display data are fed to the CPU 25 of the key telephone set 1-1 through the output control portion 6 and the data channel 12-1. As a result, the LCD 29 displays the content of the guide display data, for example, the message "please push the simplified dial function button".

When the user follows the displayed guidance to push the simplified dial function button among the function selection buttons 33 (FIG. 3) of the key telephone set 1-1, the information concerning input of this button is again transferred to the main control unit 10 as the second control information. The main control circuit 4 accepts the second control information transmitted through the data channel 11-1 and the input control portion 3 (step S5), and judges whether the second control information is the valid button data (the simplified dial function button data) and whether the HELP button 34 (FIG. 3) has been pushed (step S6). That is, the main control circuit 4 judges whether the second control information is the same with the valid button data stored in the register or whether simulation is to be completed by the HELP button.

If it is judged that any button, other than the simplified dial function button and the HELP button, has been pushed at the step S6, the main control circuit 4 produces the error data to invalidate the input of this button (step S7).

On the other hand, if it is judged that the simplified dial function button has been pushed, the main control circuit 4 proceeds to the processing of the step S8. At the step S8, judgment is made upon completion of the processing and, since it is yet to be completed, the process is advanced to the step S4. At the step S4, the main control circuit 4 reads the guide display data for conducting the next button operation from the guide/function display table 16-4 which is the storage area pointed by the guide/function indication pointer in the valid operation table 17-4 in the memory circuit 5. Since the guide/function display table 16-4 stores the operation indication pointer as well as the guide display data therein, they are read out together, and the valid button data in the valid operation table 17-4 are stored in the register within the main control circuit by this pointer. Note that the valid button data are data concerning the button (the dial button) which is pushed after the simplified dial function button.

The guide display data read from the guide/function display table 16-4 of the memory circuit 5 at the step S4 are transmitted to the key telephone set 1-1 and, when the CPU 25 detects this transmission, the LCD 29 displays the content of the guide display data. Here, the content of display is the message "please input the simplified dial number". This guidance is similarly displayed by pushing the simplified dial function button when actually making the outgoing call.

The user sees the displayed guidance and inputs the simplified dial number. The simplified dial number to be input is a one digit number. When a one digit dial button is pushed, this input is accepted as the second control information by the main control circuit 4 of the main control unit (step S5). The main control circuit 4 then performs the processing of the step S6. If it is judged that the dial button has been pushed by comparing the second control information with the content (the data relating the dial button) stored in the register in the similar manner as the above-described operation of the outgoing call button, the processing of the step S8 is effected. However, the processing is not to be completed at this stage, it is advanced to the step S4. The indication simulation data are read from the guide/function display table 16-4 indicated by the valid operation table 17-4 at this step. The indication simulation data are transferred to the key telephone set 1-1 through the data channel 12-1, and the central office line lamp is turned on. This lighting falsely represents the lighting performed when the central office line is held in the actual simplified dial operation. The processing is thereafter terminated at the step S10. Completion is detected at this step, thereby terminating simulation of the outgoing call.

4. Tripartite Conference Operation

The tripartite conference function enables the tripartite communication by calling up any other key telephone set which is to be connected to the main control unit 10 during the service through the central office line.

In the first place, the content of a displayed initial screen is the message "select from outgoing call 1, hold 2, transfer 3, simplified dial 4 and conference 5".

When a user pushes the dial button "5" in order to simulate the conference operation, this input is transmitted as the second control information from the key telephone set 1-1 to the main control unit 10 through the data channel 11-1. By doing so, the main control circuit 4 accepts the second control information (step S3), thereby executing the processing of the next step.

The main control circuit 4 reads the display data pointer 15-5 in the function menu table illustrated in FIG. 5 in response to the second control information obtained by the dial button "5", and further reads the guide display data and the indication simulation data provided at an address designated by this pointer from the guide/function display table 16-5. In addition, the operation indication pointer is also read from the guide/function display table 16-5, and the valid button data in the valid operation table 17-5 are stored in the register within the main control circuit by the pointer (step S4). The valid button data are data concerning the conference button.

The guide display data read from the guide/function display table 16-5 are used for conducting the first operation of the button. The guide display data are sent to the CPU 25 of the key telephone set 1-1 through the output control portion 6 and the data channel 12-1. The LCD consequently displays the content of the guide display data, e.g., the message "please push the conference button". Further, the indication simulation data correspond to the lamp indication data for indicating one of the central office line lamps used for falsely informing that the key telephone set is holding the central office line. Since the actual tripartite conference operation is performed when the central office line is being held, this message is displayed on the assumption of the scene immediately before the actual tripartite conference operation.

When the user follows the displayed guidance on the LCD 29 to push the conference button among the function selection buttons 33 (FIG. 3) of the key telephone set 1-1, this input is again transferred to the main control unit 10 as the second control information. The main control circuit 4 accepts the second control information through the data channel 11-1 and the input control portion 3 (step S5) and judges whether the second control information is the valid button data (the conference button data) stored in the register at the step S4. At the same time, the main control circuit 4 also judges whether the HELP button 34 (FIG. 3) has been pushed (step S6).

If it is judged that any button other than the conference button and the HELP button has been pushed at the step S6, the main control circuit 4 generates the error data to invalidate the input of this button (step S7).

On the other hand, if it is judged that the conference button has been pushed, the main control circuit 4 proceeds to the processing of the step S8. At the step S8, judgment is made upon completion of the processing, but it is yet to be completed, thereby advancing to the step S4. At the step S4, the main control circuit 4 reads the indication simulation data, the tone simulation data and the guide display data for conducting the next button operation from the guide/function display table 16-5 which is the storage area pointed by the guide/function indication pointer in the valid operation table 17-5 of the memory circuit 5. The operation indication pointer is read together with the guide display data because the both of them are stored in the guide/function display table 16-5, and the valid button data in the valid operation table 17-2 are stored in the register within the main control circuit by the thus-read pointer. Note that the valid button data are data relating to the button (the dial button) which is pushed after the transfer button.

The indication simulation data read from the guide/function display table 16-5 of the memory circuit 5 at the step S4 correspond to the lamp indication data for executing blinking action of the conference indication lamp 33b (FIG. 3) of the key telephone set 1-1. The CPU 25 of the key telephone set 1-1 turns on the conference indication lamp 33b using the indication simulation data. Meanwhile, at the step S4, when the tone simulation data are read from the memory circuit 5 shown in FIG. 1, and the main control circuit 4 controls the tone ROM 9 and the channel switch circuit 7 so that the second tone is fed to the voice channel 12-1 via the channel switch circuit 7. As a result, the second tone is heard from the handset 22 or the speaker 23 of the key telephone set 1-1.

On the other hand, the guide display data are transmitted to the key telephone set 1-1 through the output control portion 6 and the data channel 12-1 and, when the CPU 25 detects the guide display data, the LCD 29 displays the content of them. Here, the content of display is the message "please input the extension number for participation in the conference".

Display of the guidance, blinking of the conference display lamp and generation of the second tone are similarly carried out by pushing the conference button when the actual conference operation is performed.

The user sees the displayed guidance and inputs the extension number. The phone number to be input here may be a one digit number. When any dial button is pushed, this input is accepted as the second control information by the main control circuit 4 of the main control unit 10 (step S5). The main control circuit 4 then executes the processing of the step S6. If it is judged that the dial button has been pushed by comparing the second control information with the content (the dial button data) stored in the register at this stage in the similar manner as the above-mentioned operation of the conference button, the processing of the step S8 is effected. Since the processing is yet to be completed at this time, it is again returned to the step S4.

At the step S4, the main control circuit 4 reads the tone simulation data and the guide display data for conducting the subsequent button operation from the guide/function display table 16-5 which is the storage area indicated by the guide/function indication pointer in the valid operation table 17-5 of the memory circuit 5. The operation indication pointer is read out together with the guide display data because the both of them are stored in the guide/function display table 16-5, and the valid button data in the valid operation table 17-5 are stored in the register within the main control circuit by the thus-read pointer. Note that the valid button data are data relating to the button (the conference button) which is pushed after the dial button.

The tone simulation data read from the guide/function display table 16-5 of the memory circuit 5 at the step S4 are used for generating the ringing tone representing that participants of the tripartite conference are being called up. The main control circuit 4 controls the tone ROM 9 and the channel switch circuit 7 using the tone simulation data. As a result, the ringing tone is sent to the voice channel 11-1 through the channel switch circuit 7 and output from the handset 22 or the speaker 23 of the key telephone set 1-1.

Meanwhile, the guide display data are transmitted to the key telephone set 1-1 via the output control portion 6 and the data channel 12-1 and, when the CPU 25 detects this transmission, the LCD 29 displays the content of the guide display data. Here, the content of display is the message "please push the conference button when the other party answers". Display of the guidance and generation of the ringing tone are similarly executed by inputting the extension number when the actual conference operation is carried out.

The user sees the displayed guidance and pushes the conference button. When the conference button is pushed, this input is accepted as the second control information by the main control circuit 4 of the main control unit 10 (step S5). The main control circuit 4 then performs the processing of the step S6. At this stage, if it is judged that the conference button has been pushed by comparing the second control information with the content (the data concerning the conference button) stored in the register, the processing of the step S8 is carried out. The processing is, however, yet to be completed, and it is hence advanced to the step S4. Here, the indication simulation data are read from the guide/function display table 16-5 indicated by the valid operation table 17-5. The indication simulation data are transferred to the key telephone set 1-1 through the data channel 12-1, and the blinking conference lamp is turned on. The processing is thereafter completed at the step S10.

As mentioned above, the key telephone system executes simulation by the following operations:

A. The key telephone sets 1-1 to 1-m command to start simulation and generate the first control information by the HELP button directing the start of the button operation simulation.

B. The main control circuit 4 of the main control unit 10 reads the initial picture data from the second memory portion 52 of the memory circuit 5 in response to the first control information and transmits the data to a key telephone set (for example, 1-1) where the first control information was generated.

C. Any of the function selection buttons is pushed in the key telephone set 1-1, and the second control information representing data of this button is generated.

D. The main control circuit 4 makes judgment upon whether the data represented by the second control information were provoked by the appropriate button operation.

E. Only if it is judged that the data were obtained by the adequate button operation, the main control circuit 4 reads the indication simulation data, the tone simulation data or the guide display data from the second or the third memory portion 52 or 53 of the memory circuit 5 in response to the second control information and transmits the thus-read data to the key telephone set 1-1. The indication simulation data and the guide display data are sent over the data channel. The tone simulation data correspond to the tone signal or the ringing tone read from the tone ROM 9 and are transmitted through the voice channel.

F. The key telephone set 1-1 indicates the lamp unit 27 in accordance with the indication simulation data. The guide of the subsequent button operation is displayed by the guide display data. The tone signal or the ringing tone is output from the handset or the speaker.

G. The next button is pushed in the key telephone set 1-1 in accordance with the displayed guide, and another second control information is produced.

The above operations of C, D, E, F and G are sequentially executed until completion of the simulation. During execution of the simulation, the central office line is not seized and the tone signal is not transmitted over the central office line even if the button is pushed. Incidentally, the key telephone sets (the telephone sets other than the telephone set 1-1 in the above description) whose HELP button is not pushed is capable of the usual operation.

When the main control unit 10 shown in FIG. 1 detects the incoming call by the central office line interface during the simulation described in connection with FIG. 6, it cancels the simulation. In other words, the main control circuit 4 terminates the simulation by an incoming call detection signal fed from the central office line interface 8. The termination of the simulation is also performed when the HELP button 34 (FIG. 3) is pushed again.

The present invention is not restricted to the above-described embodiments and thereby various modifications thereof are possible within the true scope of the invention. For example, in regard of the simulation, the tone simulation may not be effected as long as the guidance of the operation button is displayed and the lamp unit 27 is indicated. However, a user can feel as if he or she are actually operating the button and easily master the button operation when the tone simulation is also performed.

Further, a method for operating the buttons or indicating the indication lamps in order to execute the functions such as the outgoing call, hold, transfer, simplified dial and tripartite conference functions is not restricted to the above embodiments. In addition, as the state indicator, the lamp unit 27 may be substituted by electro-luminescence indicators.

Although the starting and terminating operation of simulation are executed by pushing the HELP button 34, it may be performed by pushing any particular dial buttons.

Furthermore, although the operation guide is displayed on the display of the key telephone set by using the guide display data stored in the memory circuit 5 in the above embodiments, a guide voice generation circuit may be provided to the main control unit to enable the voice output.

Figure 7:
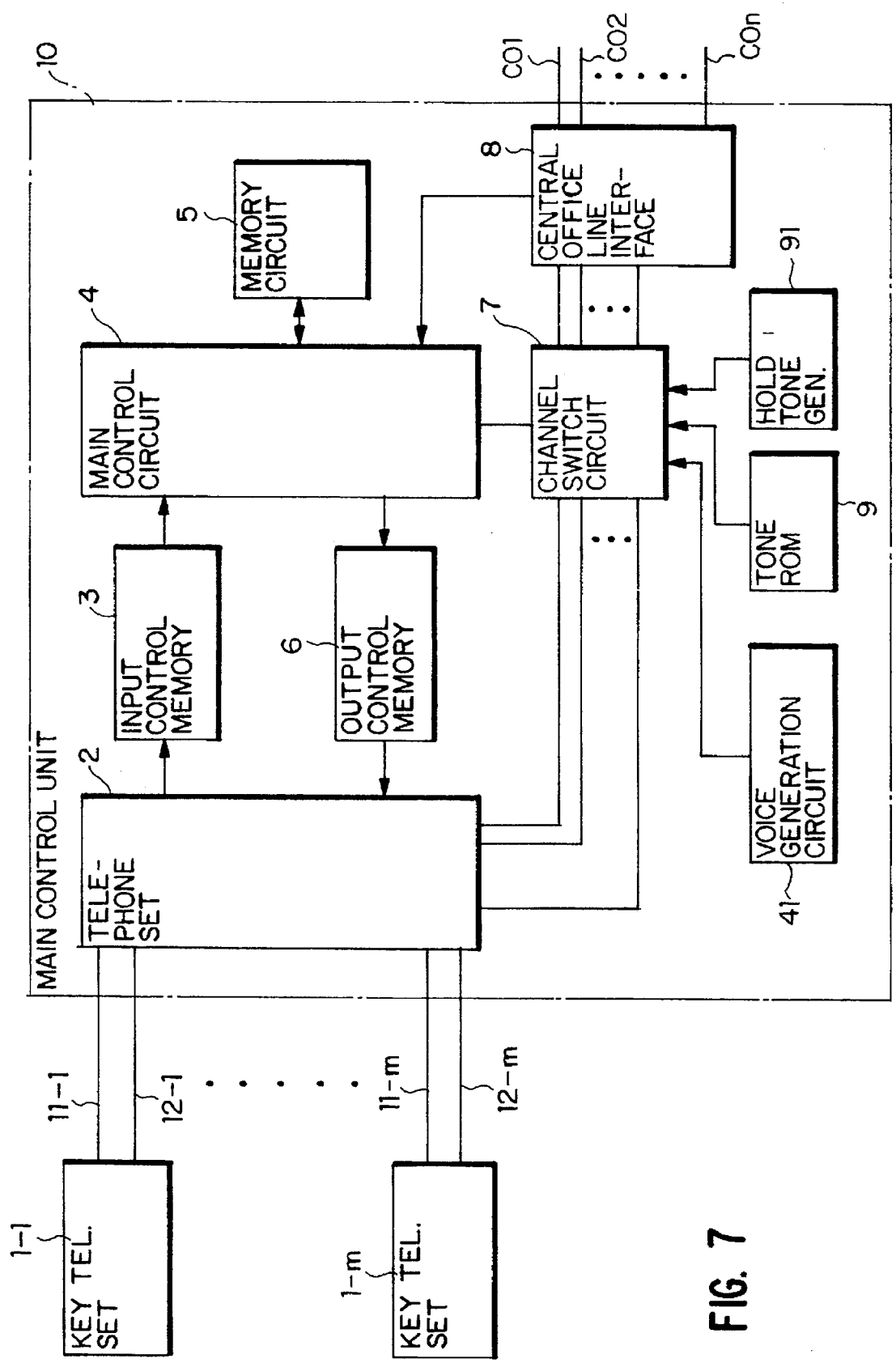
FIG. 7 is a block diagram showing a key telephone system according to another embodiment of the present invention.

FIG. 7 is a block diagram showing the main control unit having a guide voice generation circuit. In the drawing, a voice synthesizing unit 41 is controlled by the main control circuit 4 of the main control unit so that guide voice data for conducting the button operation are read out to be transmitted to the voice channel via the channel switch circuit 7. The guide voice data are received by a key telephone set to be converted into analog signals and thereafter output from the handset 22 or the speaker 23. The guide voice data are voice data for conducting the button operation after the initial picture is displayed. The guide voice is repeatedly output until the next button is pushed. In FIG. 7, any other operation is the same with those in the above-mentioned embodiments.

As described above, according to the invention, since the state where the key telephone system is actually used is falsely created to urge the button operation by a user, he or she can quickly master the operation method.

What is claimed is:

1. In a key telephone system having a plurality of key telephone sets, and a main control unit for controlling the key telephone sets to execute a plurality of functions in accordance with button operations of the key telephone sets, each of the key telephone sets comprising selection buttons for selecting a plurality of functions, information output means for outputting first control information which directs a start of simulation and second control information provoked by operations of said selection buttons to the main control unit, state indicators for indicating execution states of the functions, voice outputting means for outputting a tone and a voice, and a display for displaying data concerning a plurality of the functions, and the main control unit comprising:

first memory means for storing guide display data for displaying information to guide a button operation procedure required for executing the functions on said display;

second memory means for storing indication simulation data for executing indication simulation of said state indicators;

third memory means for storing tone simulation data for executing tone simulation of tone outputs from said voice outputting means;

initial state setting means, responsive to the first control information, for setting an initial state of simulation at a particular key telephone set which output the first control information; and simulation controlling means, responsive to the second control information received after the first control information, for controlling an execution of the indication simulation or tone simulation at the particular key telephone set in accordance with the indication simulation data or tone simulation data stored in said second or third memory means, and controlling the display at the particular key telephone set in response to the guide display data stored in said first memory means.

2. The key telephone system as set forth in claim 1, wherein said third memory means comprises a tone signal memory circuit for storing the tone simulation data as tone signals, and said simulation controlling means further comprises tone voice outputting means for outputting the tone signals to the particular key telephone set.

3. The key telephone system as set forth in claim 1, wherein said simulation controlling means comprises:

means for judging whether the operation of said selection buttons represented by said second control information is the operation complying with the operation procedure; and means for executing the indication simulation or tone simulation at the particular key telephone set in accordance with the indication simulation data or the tone simulation data read from the second or third memory means and further executing the display in accordance with the guide display data read from the first memory means if it is judged that the operation complies with the operation procedure.

4. The key telephone system as set forth in claim 3, wherein said executing means generates error data if it is judged that the operation does not comply with the operation procedure.

5. The key telephone system as set forth in claim 1, wherein said initial state setting means reads initial guide display data from said first memory means for displaying an initial picture for the simulation on said display in response to the first control information and outputs them to the particular key telephone set.

6. The key telephone system as set forth in claim 1, wherein said main control unit further comprises a detection circuit for detecting an incoming call, and said simulation controlling circuit stops the simulation in response to an incoming call being detected by said detection circuit.

7. In a key telephone system having a plurality of telephone sets, and a main control unit for controlling the key telephone sets to execute a plurality of functions in accordance with button operations of the key telephone sets, each of the key telephone sets comprising selection buttons for selecting a plurality of functions, information output means for outputting first control information directs a start of simulation and second control information provoked by operations of said selection buttons to the main control unit, state indicators for indicating execution states of the functions, and a display for displaying data concerning a plurality of the functions, and the main control unit comprising:

first memory means for storing guide display data for displaying information to guide a button operation procedure required for executing the functions on said display;

second memory means for storing indication simulation data for executing indication simulation of said state indicators;

initial state setting means, responsive to the first control information, for setting an initial state of simulation at a particular key telephone set which output the first control information; and simulation controlling means, responsive to the second control information received after the first control information, for controlling an execution of the indication simulation at the particular key telephone set in accordance with the indication simulation data stored in said second memory means, and controlling the display at the particular key telephone set in response to the guide display data stored in said first memory means.

8. The key telephone system as set forth in claim 7, wherein said simulation controlling means comprises:

means for judging whether the operation of said selection buttons represented by said second control information is the operation complying with the operation procedure; and means for executing the indication simulation at the particular key telephone set in accordance with the indication simulation data read from the second memory means and further executing the display in accordance with the guide display data read from the first memory means if it is judged that the operation complies with the operation procedure.

9. The key telephone system as set forth in claim 7, wherein said main control unit further comprises a detection circuit for detecting an incoming call, and said simulation controlling circuit stops the simulation in response to an incoming call being detected by said detection circuit.

10. In a key telephone system having a plurality of key telephone sets, and a main control unit for controlling the key telephone sets to execute a plurality of functions in accordance with button operations of the key telephone sets, each of the key telephone sets comprising selection buttons for selecting a plurality of functions, information output means for outputting first control information which directs a start of simulation and second control information provoked by operations of said selection buttons to the main control unit, state indicators for indicating execution states of the functions, voice outputting means for outputting a tone and a voice, and a display for displaying data concerning a plurality of the functions, and the main control unit comprising:

voice generating means for generating voice data representing information to guide a button operation procedure required for executing the function;

first memory means for storing indication simulation data for executing indication simulation of said state indicators;

second memory means for storing tone simulation data for executing tone simulation of tone outputs from said voice outputting means;

initial state setting means, responsive to the first control information, for setting an initial state of simulation at a particular key telephone set which output the first control information; and simulation controlling means, responsive to the second control information received after the first control information, for controlling an execution of the indication simulation or tone simulation at the particular key telephone set in accordance with the indication simulation data or tone simulation data stored in said first or second memory means, and controlling the voice output of said voice outputting means of the particular key telephone set responsive to the voice data.

* * * * *

UNITED STATES PATENT AND TRADEMARK OFFICE
CERTIFICATE OF CORRECTION

PATENT NO.    : 5,640,448
DATED         : June 17, 1997
INVENTOR(S)   : Fumiyoshi TOYOSHIMA It is certified that error(s) appears in the above-identified patent and that said Letters Patent is hereby corrected as shown below:

col. 10, line 35, after "unit" insert --10--, col. 14, line 17, after "unit" insert --10--, Signed and Sealed this Thirteenth Day of January, 1998

Attest:

Attesting Officer

BRUCE LEHMAN

*Commissioner of Patents and Trademarks*